United States Patent
Cao et al.

(10) Patent No.: US 10,045,010 B2
(45) Date of Patent: *Aug. 7, 2018

(54) METHOD AND APPARATUS OF PRIVATE DISPLAY DEVICE

(71) Applicant: International Business Machines Corporation, Armonk, NY (US)

(72) Inventors: Feng Cao, ShangHai (CN); Jianbin Tang, Doncaster East (AU); Yini Wang, Doncaster East (AU); Ziyuan Wang, Malvern East (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,587

(22) Filed: Jan. 12, 2017

(65) Prior Publication Data

US 2017/0134719 A1     May 11, 2017

(51) Int. Cl.
*G02F 1/07*     (2006.01)
*H04N 13/04*    (2006.01)
(Continued)

(52) U.S. Cl.
CPC ....... *H04N 13/0434* (2013.01); *G02B 27/281* (2013.01); *G02F 1/09* (2013.01);
(Continued)

(58) Field of Classification Search
CPC ..... G02B 27/283; G02F 1/0136; B82Y 20/00; H04Q 11/0005; H04Q 2011/0024
(Continued)

(56) References Cited

U.S. PATENT DOCUMENTS 6,552,850 B1    4/2003  Dudasik
6,597,328 B1    7/2003  Stern et al.
(Continued)

FOREIGN PATENT DOCUMENTS

WO    2013048847 A2    4/2013

OTHER PUBLICATIONS

Shoemaker, "Single Display Privacyware: Augmenting Public Displays With Private Information", Proceeding CHI '01 Proceedings of the SIGCHI Conference on Human Factors in Computing Systems, Mar. 1, 2001, pp. 522-529.
(Continued)

*Primary Examiner* — Mohammed Hasan
(74) *Attorney, Agent, or Firm* — Scully, Scott, Murphy & Presser, PC; Keivan Razavi, Esq.

(57) ABSTRACT

There is provided a system and method for providing privacy viewing of an output from a electronic display, including a first polarizer configured to polarize a display signal at a first polarization angle; a second polarizer configured to polarize a noise signal at a second polarization angle orthogonal to the first polarization angle; a combiner configured to combine the polarized display signal and the polarized noise signal, and a third polarizer configured to receive the output of the electronic display and polarize the combined polarized display and noise signal at the first polarization angle. The system includes first and second polarization rotators configured to rotate the first and second polarization angles of the combined polarized display and noise signals prior to being output by the electronic display and prior to being received by the third polarizer.

12 Claims, 5 Drawing Sheets

(51) Int. Cl.
*G02B 27/28* (2006.01)
*G02F 1/09* (2006.01)

(52) U.S. Cl.
CPC . *H04N 13/0497* (2013.01); *H04N 2013/0465* (2013.01); *H04N 2213/008* (2013.01)

(58) Field of Classification Search
USPC .................................................. 359/250–270
See application file for complete search history.

(56) References Cited

U.S. PATENT DOCUMENTS

| | | | |
|---|---|---|---|
| 6,947,014 B2 | 9/2005 | Wooten | |
| 7,170,680 B2 | 1/2007 | Macmaster | |
| 7,978,929 B2 | 7/2011 | Kim et al. | |
| 8,115,698 B2 | 2/2012 | Azor et al. | |
| 2009/0079941 A1* | 3/2009 | Miller | G03B 21/28 353/8 |
| 2011/0116017 A1 | 5/2011 | Gere | |
| 2013/0027400 A1* | 1/2013 | Kim | H04N 13/0037 345/426 |
| 2015/0234050 A1 | 8/2015 | Larson | |

OTHER PUBLICATIONS

Chan et al., "On Top of Tabletop: A Virtual Touch Panel Display", Horizontal Interactive Human Computer Systems, 2008. TABLETOP 2008. 3rd IEEE International Workshop, Oct. 1-3, 2008, pp. 169-176.

Yang et al., "Polarization Rotator Using a Hybrid Aligned Nematic Liquid Crystal Cell", Optics Express, Apr. 2, 2007, vol. 15, No. 7, pp. 1-6.

Wikipedia, "Faraday Rotator", https://en.wikipedia.org/w/index.php?title=Faraday_rotator&oldid=603899981, Apr. 12, 2014, pp. 1-2.

Beggs et al., Compact Polarization Rotators for Integrated Polarization Diversity in inP-Based Waveguides, Optics Letters, Aug. 1, 2007, vol. 32, No. 15, pp. 2176-2178.

Office Action dated Jun. 23, 2016 from parent application U.S. Appl. No. 14/876,002.

Notice of Allowance dated Oct. 13, 2016 from parent application U.S. Appl. No. 14/876,002.

List of IBM Patents or Patent Applications Treated as Related dated Jan. 12, 2017, pp. 1-2.

* cited by examiner

METHOD AND APPARATUS OF PRIVATE DISPLAY DEVICE

BACKGROUND OF THE INVENTION

This disclosure relates generally to viewing of an electronic display, and particularly to privacy viewing of an electronic display.

Nowadays, the display angle of electronic display screens has become wider and wider and very close to 180°. This is good when people want to watch movies or share several screens together. However, in most cases, especially for personal computers, tablets and smart devices such as smart phones, people would like to have some privacy on the screen.

A privacy-filter manufactured by 3M® utilizes a micro-louver technology, in which only persons directly in front of the monitor can see the image on screen. From the side, onlookers see only a darkened screen. The view is narrowed, but not against the people behind the screen and it is not easy to switch between the narrow view and the broad view.

In another prior art method, the viewing angle of the display is controlled, which is similar to the privacy filter but this still does not prevent the view behind the screen. Moreover, when the user changes position, the angle of the display must be changed accordingly, which makes use inconvenient.

Virtual private theatre glasses are known. However, with theatre glasses, the user cannot see anything but the display inside of the glasses.

Therefore, what is needed is a convenient, totally private and environment aware device.

SUMMARY OF THE INVENTION

In one embodiment, there is provided a system for providing privacy viewing of an output from an electronic display. The system comprises a first polarizer configured to polarize a display signal at a first polarization angle; a noise generator configured to supply a noise signal; a second polarizer configured to polarize the noise signal at a second polarization angle orthogonal to the first polarization angle; a combiner configured to combine the polarized display signal and the polarized noise signal, the combined display and noise signal being configured to be output by the electronic display; and a third polarizer configured to receive the output of the electronic display and polarize the combined polarized display and noise signal at the first polarization angle.

In one embodiment, there is provided a system for providing privacy viewing of an output from an electronic display, which comprises; a display signal scrambler attached to an electronic display, the display signal scrambler comprising a first polarizer configured to polarize a display signal input to the display at a first polarization angle, a noise generator configured to supply a noise signal, a second polarizer configured to polarize the noise signal at a second polarization angle orthogonal to the first polarization angle, and a combiner configured to combine the polarized display signal and the polarized noise signal, the combined display and noise signal being configured to be output by the electronic display; and a display signal descrambler comprising a third polarizer configured to receive the output of the electronic display and polarize the combined polarized display and noise signal at the first polarization angle.

In another embodiment, the system includes respective first and second polarization rotators configured to rotate the first and second polarization angles of the combined polarized display and noise signals prior to being output by the electronic display and prior to being received by the third polarizer, respectively.

In one embodiment, there is provided a method for providing privacy viewing of an output from a electronic display. The method comprises: polarizing a display signal received by the electronic display at a first polarization angle; generating a noise signal; polarizing the noise signal at a second polarization angle orthogonal to the first polarization angle; combining the polarized display signal and the polarized noise signal; outputting the combined display and noise signal being from the electronic display; and receiving the output of the electronic display and polarizing the combined polarized display and noise signal at the first polarization angle.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF PREFERRED EMBODIMENTS

In one embodiment, polarized light is used to enable a privacy display. The display applicable to this disclosure is any electronic display, including but not limited to a display for, a computer monitor, a television, tablet or smart phone, which outputs a display signal. The display signal may include but is not limited to any image that can be output from an electronic display, such a video and still images. The display signal is polarized in one direction. Noise polarized in the orthogonal direction is added to the polarized display signal making the combined display unrecognizable. The polarization angle can be rotated randomly and only the authorized viewers can synchronize the polarization and see the display clearly. The system can be set in multiple working modes: Unique: Only one viewer can see the screen; Group: Only a group of viewers can see the screen; and Broadcast mode: everyone can see the screen. Since in nature light isn't polarized, the environment can be seen through the polarized glass as well.

Figure 1:
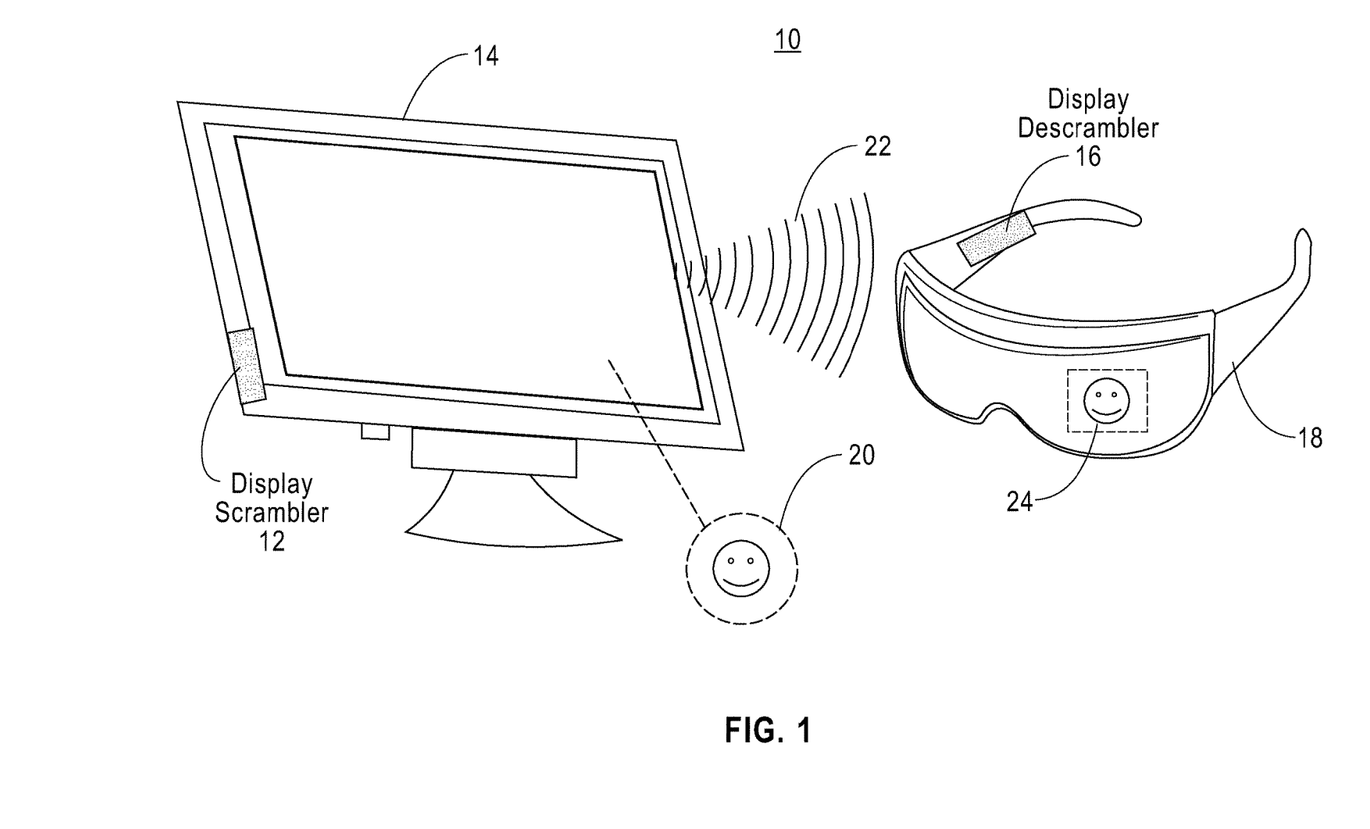
FIG. 1 is a schematic diagram of the system for providing privacy viewing of an output from a electronic display in one embodiment.

As shown in FIG. 1, the privacy display system 10 includes display scrambler 12 added in the screen side of a electronic display 14. A display descrambler 16 is added in the viewer side of a viewing device such as an eyeglass frame 18. The original image 20 is input to the electronic display 14 and is scrambled by the scrambler 12. The scrambled display signal that is output from the display 14 cannot be viewed by the naked eye. Only a user wearing the eyeglass frame 18 with the descrambler 16 can view the descrambled image 24.

Figure 2:
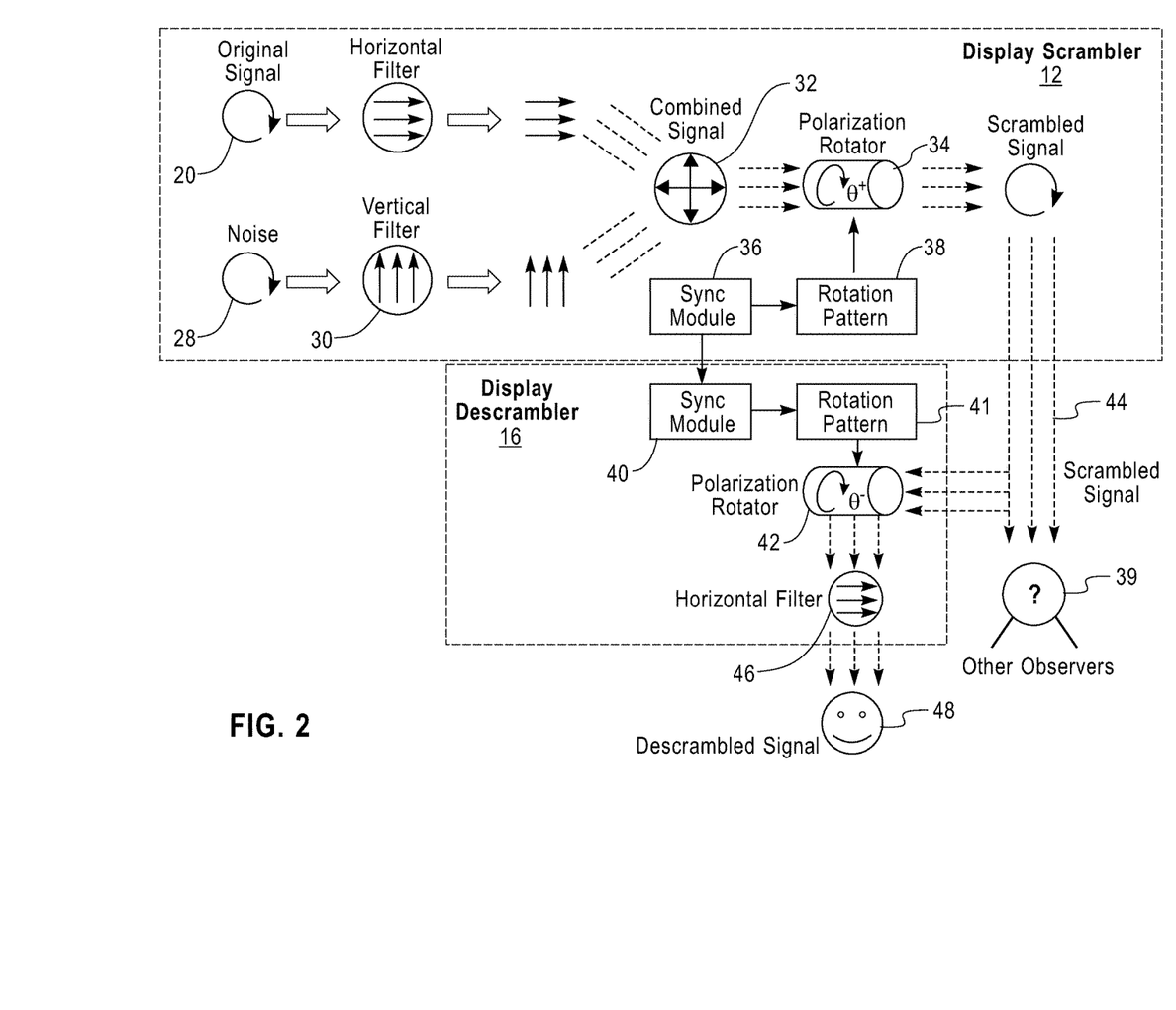
FIG. 2 is block diagram of the system for providing privacy viewing of an output from a electronic display in one embodiment.

FIG. 2 shows the details of the scrambler 12 and the descrambler 16. In the scrambler 12, the original display signal 20 is polarized via a polarizer or polarization filter 26 with predefined angle è1. A white noise signal generator 28 generates a white noise signal that is polarized via a linear polarizer or polarization filter 30 with predefined angle è2. The polarization angles è1 and è2 are orthogonal to each other. The embodiment shown in FIG. 2 shows the two angles as being vertical and horizontal. However, this is just one example, as any two angles may be used, as long as they are orthogonal to each other.

The polarized original signal and the orthogonally polarized noise signal are combined in a signal processing combiner 32. As a result, after combining the polarized display and noise, the original display signal cannot be recognized by naked eyes, but can still be restored by the polarized glasses with the polarization angel è1.

To further protect the sensitive display against unauthorized polarized glasses users, a polarization rotator 34 is applied to the combined signal to constantly change the polarization angle based on a predefined rotation pattern. In one embodiment a high speed random rotator is used, such as one sold by Lightwaves 2020 of Milipitas Calif. In one embodiment, a thin, fast, low loss polarization rotator is used. For example, two mylar strips with thickness about 6.0 μm can be used as the cell gap spacers and then the cell is capillary filled with the liquid crystal\ (E7, Merck-BDH) (LC=liquid crystal) as described in Fuzi Yang, *Polarization Rotator Using a Hybrid Aligned Nematic Liquid Crystal Cell*. Vol. 15, No. 7, Optics Express, Apr. 2, 2007. In one embodiment, the accuracy and insertion loss is low by having the total device length kept short (less than 50 μm) and the insertion efficiency high at 81%±19%, which corresponds to an insertion loss of 1 dB, as described in Daryl M. Beggs, 1, * Michele Midrio, 2 and Thomas F. Krauss1, *Compact polarization rotators for integrated polarization diversity in InP-based waveguides, OPTICS LETTERS*/Vol. 32, No. 15/2176/Aug. 1, 2007.

Alternatively, a random rotation pattern may be used. In one embodiment, the rotation pattern can be regarded as a key for encrypting display signal, and it may consist of dynamic rotation speed and the initial offset of polarization angle. A rotation pattern generator 38 generates the rotation pattern applied to the polarization rotator 34.

The continuous rotation of the polarized angle prevents the display signal from being directly recognized by other users 39 with their naked eye or using any polarized glasses with a fixed angle. A sync module 36 passes the rotation pattern of rotation pattern generator 38 to the descrambler 16 by sending a synchronization signal. Sync module 36 can be in one embodiment an active shutter 3D system, which uses alternate frame sequencing, also known as alternate image, alternating field, field sequential or eclipse method, which is a technique of displaying stereoscopic 3D images. The method works by only presenting the image intended for the left eye while blocking the right eye's view, then presenting the right-eye image while blocking the left eye, and repeating this so rapidly that the interruptions do not interfere with the perceived fusion of the two images into a single 3D image. This method for the sync module 36 is described in Active Shutter 3D Technology for HDTV", PhysOrg, Sep. 25, 2009. However, any kind of sync mechanism can be used for sync module 36 provided it can make sure the random rotation pattern can be correctly and immediately transmitted from the display to glass.

Figure 3:
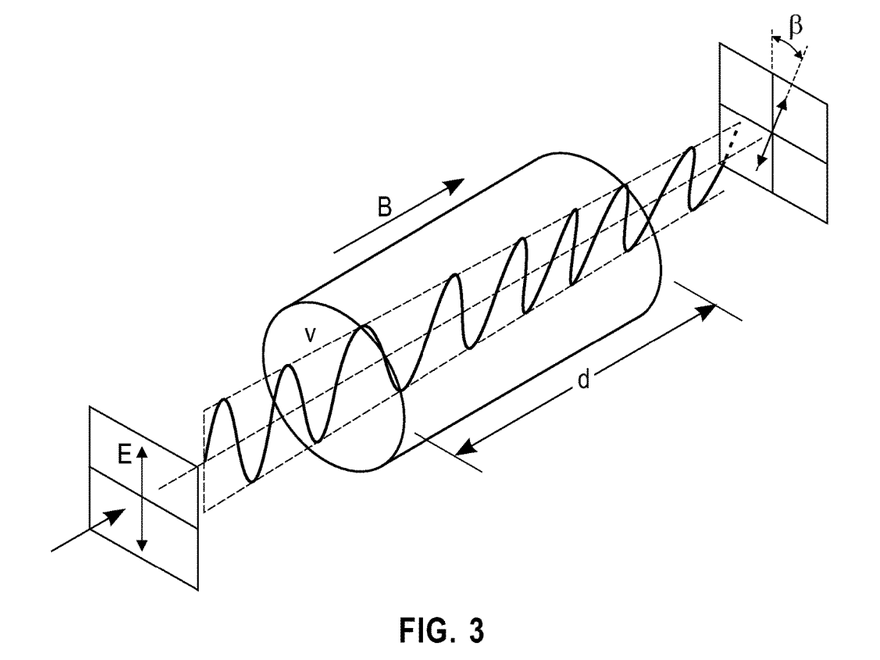
FIG. 3 is schematic depiction of the operation of a polarization rotator used in of the system for providing privacy viewing of an output from a electronic display in one embodiment.

FIG. 3 schematically depicts the operation of a polarization rotator. The polarization rotator operates by the Faraday Effect. The Polarization rotator can rotate the polarization axis of a linearly polarized light signal. The angle of rotation of the polarization is decided by B, d and v, shown in FIG. 3. B is the magnetic flux density in the direction of propagation (in teslas). d is the length of the path (in meters) where the light and magnetic fields interact. v is the Verdet constant for the material. This empirical proportionality constant (in units of radians per tesla per meter) varies with wavelength and temperature and is tabulated for various materials. B can be controlled electrically by voltage. As noted above, polarization rotators can be very thin, such as the liquid crystal cell of 6 um disclosed in Fuzi Yang, *Polarization Rotator Using a Hybrid Aligned Nematic Liquid Crystal Cell*. Vol. 15, No. 7, Optics Express, Apr. 2, 2007.

Referring again to FIG. 2, in the descrambler 16, a sync module 40 will synchronize with scrambler sync module 36 to cause rotation pattern generator 41 to apply the same scrambler rotation pattern to polarization rotator 42. Polarization rotator 42 anti-rotates the scrambled display signal 44, using the same angle and pace of the scrambler polarization rotator 34. Thereafter, by passing anti-rotated signal through polarizer/polarization filter 46 having the same polarization angle of filter 26 of the scrambler 12, the display signal 48 is restored for privacy viewing by the wearer of the descrambler 16.

In the synchronization mode, the scrambler 12 and descrambler 16 can have an authorization technology to make sure the rotation pattern cannot be easily detected by unauthorized users. For example, the scramble pattern generator can use a user's PIN or other security technologies to create a unique scramble pattern for each user. Separate synchronization technologies can be used, in one embodiment, for the scrambler 12 and the descramble 16. In addition, the synchronization signal can be sent wired or wireless. For example: scrambler 12 sends a wireless synchronization preamble and descrambler 16 syncs to that or both sync to some external reference like Wi-Fi AP. Through the authorization process, unique private view and group based private view can be supported.

Figure 4:
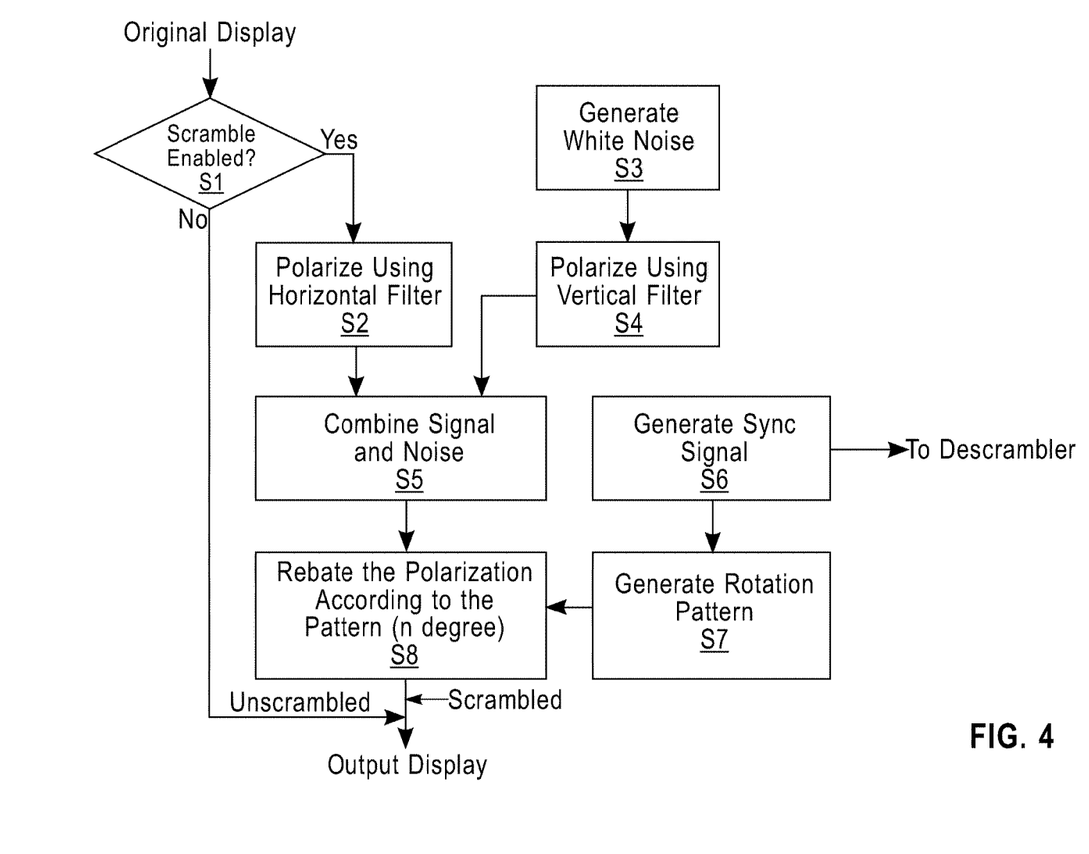
FIG. 4 is flowchart of the method for scrambling the output signal of a electronic display in one embodiment.

FIG. 4 is a flow chart depicting the method of generating a scrambled display output. In step S1, whether scramble is enabled is determined. If NO then the original unscrambled display signal is output. If YES, then the display signal is polarized in step S2 using first polarization filter, shown as horizontal is this embodiment. In step S3, white noise is generated and in step S4 the white noise is polarized using a vertical polarization filter. In step S5, the polarized original signal and orthogonally polarized white noise signal are combined. In step S6 a sync signal is generated and sent to a rotation pattern generator. The sync signal is also sent for receipt by the descrambler in step S6. In step S7, a rotation pattern is generated based on the sync signal. In step S8, the polarization of the combined original and noise signal is rotated according to the rotation pattern and the scrambled signal is output.

Figure 5:
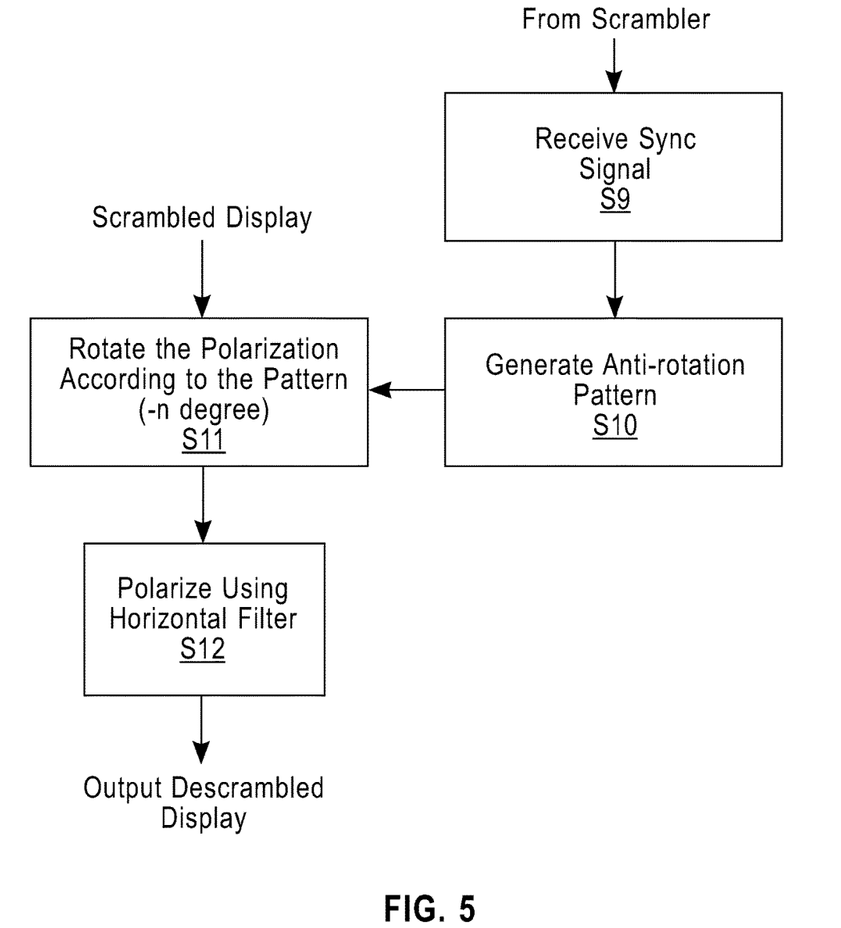
FIG. 5 is flowchart of the method for descrambling the output signal of a electronic display in one embodiment.

FIG. 5 is a flow chart that depicts the method of descrambling the scrambled electronic display signal. In step S9, the sync signal from the scrambler is received by the descrambler. In step S10 the anti-rotation pattern is generated. In step S11 the scrambled display signal is received and the polarization is rotated according to the anti-rotation pattern. In step S12 the anti-rotated signal is polarized using the horizontal polarization filter and the descrambled electronic display signal is output for viewing only by the wearer of the descrambler.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowcharts, block diagrams and schematics in the Figures illustrate the architecture, functionality, and operation of possible implementations of systems, methods and computer program products according to various embodiments of the present invention. In this regard, each block in the flowcharts, schematics or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A system for providing privacy viewing of an output from an electronic display, the system comprising:
    a first polarizer configured to polarize a display signal at a first polarization angle;
    a noise generator configured to supply a noise signal;
    a second polarizer configured to polarize the noise signal at a second polarization angle orthogonal to the first polarization angle;
    a combiner configured to combine the polarized display signal and the polarized noise signal, the combined display and noise signal being configured to be output by the electronic display;
    a first polarization rotator configured to rotate the first and second polarization angles of the combined polarized display and noise signals prior to being output by the electronic display;
    a second polarization rotator configured to rotate the first and second polarization angles of the combined polarized display and noise signals prior to being received by the third polarizer; first and second rotation pattern generators for providing a rotation pattern to the first and second polarization rotators, the rotation pattern comprising an encryption key including a dynamic rotation speed of the first polarization rotator and an initial offset of the first polarization angle;
    first and second synchronization modules for synchronizing the rotation pattern provided to the first and second polarization rotators, the first and second synchronization modules each comprising a 3D shutter system for displaying stereoscopic 3D images; and
    a third polarizer configured to receive the output of the electronic display and polarize the combined polarized display and noise signal at the first polarization angle.

2. The system according to claim 1, wherein the first and second rotation pattern generators provide a predefined or random rotation pattern to the first and second polarization rotators.

3. The system according to claim 1, wherein the respective rotation pattern generators require a unique user authorization code to generate a corresponding unique predefined rotation pattern.

4. The system according to claim 1, wherein the first and second polarization rotators operate according to the Faraday Effect.

5. A system for providing privacy viewing of an output from an electronic display, the system comprising:
    a display signal scrambler attached to a electronic display, the display signal scrambler comprising a first polarizer configured to polarize a display signal input to the display at a first polarization angle, a noise generator configured to supply a noise signal, a second polarizer configured to polarize the noise signal at a second polarization angle orthogonal to the first polarization angle, a combiner configured to combine the polarized display signal and the polarized noise signal, a first polarization rotator configured to rotate the first and second polarization angles of the combined polarized display and noise signals, a first rotation pattern generator for providing a first rotation pattern to the first polarization rotator, and a first synchronization module for synchronizing the first rotation pattern provided to the first polarization rotator, the combined and rotated display and noise signal being configured to be output by the electronic display; and
    a display signal descrambler comprising a second polarization rotator configured to receive the output of the electronic display and rotate the first and second polarization angles of the combined and rotated polarized display and noise signals, a second rotation pattern generator for providing a second rotation pattern to the second polarization rotator, a second synchronization module for synchronizing the second rotation pattern provided to the second polarization rotator, and a third polarizer configured to polarize the combined and rotated polarized display and noise signal at the first polarization angle, wherein the first and second rotation patterns comprise an encryption key including a dynamic rotation speed of the first polarization rotator and an initial offset of the first polarization angle, and wherein the first and second synchronization modules synchronize the first and second rotation patterns to each other, the first and second synchronization modules each comprising a 3D shutter system for displaying stereoscopic 3D images.

6. The system according to claim 5 wherein the first and second rotation pattern generators provide respective predefined or random rotation patterns to the first and second polarization rotators.

7. The system according to claim 5 wherein the first and second rotation pattern generators require a unique user authorization code to generate a corresponding unique predefined rotation pattern.

8. The system according to claim 5, wherein the first and second polarization rotators operate according to the Faraday Effect.

9. A method for providing privacy viewing of an output from an electronic display, the method comprising:
   polarizing a display signal input to the display at a first polarization angle,
   supplying a noise signal,
   polarizing the noise signal at a second polarization angle orthogonal to the first polarization angle,
   combining the polarized display signal and the polarized noise signal,
   rotating the first and second polarization angles of the combined polarized display and noise signals,
   providing a first rotation pattern to a first polarization rotator,
   synchronizing the first rotation pattern provided to the first polarization rotator,
   outputting the combined and rotated display and noise signal to the electronic display;
   receiving the output of the electronic display,
   rotating the first and second polarization angles of the combined and rotated polarized display and noise signals,
   providing a second rotation pattern to a second polarization rotator,
   providing an encryption key including a dynamic rotation speed of the first polarization rotator and an initial offset of the first polarization angle,
   synchronizing the second rotation pattern provided to the second polarization rotator, and
   polarizing the combined and rotated polarized display and noise signal at the first polarization angle,
   wherein the first and second rotation patterns are synchronized to each other by first and second synchronization modules each comprising a 3D shutter system for displaying stereoscopic 3D images.

10. The method according to claim 9, further including providing a predefined or random rotation pattern to the first and second polarization rotators.

11. The method according to claim 9, further including requiring a unique user authorization code to generate a corresponding unique predefined rotation pattern.

12. The method according to claim 9, further including rotating the first and second polarization angles according to the Faraday Effect.

* * * * *